United States Patent
Ramalingam

(10) Patent No.: US 7,639,667 B1
(45) Date of Patent: Dec. 29, 2009

(54) METHOD AND SYSTEM FOR TRANSMITTING MESSAGES IN A COMMUNICATIONS NETWORK

(75) Inventor: Thiyagesan Ramalingam, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 930 days.

(21) Appl. No.: 11/018,329

(22) Filed: Dec. 21, 2004

Related U.S. Application Data

(63) Continuation of application No. 09/687,852, filed on Oct. 13, 2000, now Pat. No. 6,845,250.

(51) Int. Cl.
 *H04L 12/66* (2006.01)

(52) U.S. Cl. .................... 370/352; 370/401

(58) Field of Classification Search ......... 370/351–356, 370/400, 401
See application file for complete search history.

(56) References Cited

U.S. PATENT DOCUMENTS

| | | | | |
|---|---|---|---|---|
| 6,167,043 A | 12/2000 | Frantz | .................. | 370/356 |
| 6,169,795 B1 | 1/2001 | Dunn et al. | .................. | 379/209 |
| 6,222,829 B1 | 4/2001 | Karlsson et al. | .................. | 370/329 |
| 6,327,260 B1* | 12/2001 | McGrew | .................. | 370/385 |
| 6,341,128 B1 | 1/2002 | Svedberg | .................. | 370/352 |
| 6,449,278 B2* | 9/2002 | Rose | .................. | 370/397 |
| 6,477,494 B2 | 11/2002 | Hyde-Thomson | .................. | 704/260 |
| 6,487,533 B2 | 11/2002 | Hyde-Thomson et al. | ... | 704/260 |
| 6,512,764 B1 | 1/2003 | Carew et al. | .................. | 370/356 |
| 6,519,252 B2 | 2/2003 | Sallberg | .................. | 370/356 |
| 6,542,503 B1 | 4/2003 | Xu et al. | .................. | 370/352 |
| 6,584,110 B1 | 6/2003 | Mizuta et al. | .................. | 370/401 |
| 6,594,253 B1 | 7/2003 | Sallberg et al. | .................. | 370/349 |
| 6,600,734 B1 | 7/2003 | Gernert et al. | .................. | 370/352 |
| 6,622,016 B1 | 9/2003 | Sladek et al. | .................. | 379/201.01 |
| 6,674,748 B1* | 1/2004 | Dykhuizen et al. | .................. | 370/352 |
| 6,683,881 B1* | 1/2004 | Mijares et al. | .................. | 370/401 |
| 2002/0016937 A1 | 2/2002 | Houh | .................. | 714/43 |
| 2003/0133558 A1 | 7/2003 | Kung et al. | .................. | 379/215.01 |
| 2003/0193933 A1 | 10/2003 | Jonas et al. | .................. | 370/352 |

* cited by examiner

*Primary Examiner*—Pankaj Kumar
*Assistant Examiner*—Duc T Duong
(74) *Attorney, Agent, or Firm*—Baker Botts L.L.P.

(57) ABSTRACT

A method and system for transmitting messages in a communications network is disclosed. A signaling gateway receives a message directed to a destination circuit. The signaling gateway is coupled to multiple voice gateways, including a destination voice gateway coupled to the destination circuit. The signaling gateway determines the destination voice gateway and sends the message to the destination voice gateway.

18 Claims, 2 Drawing Sheets

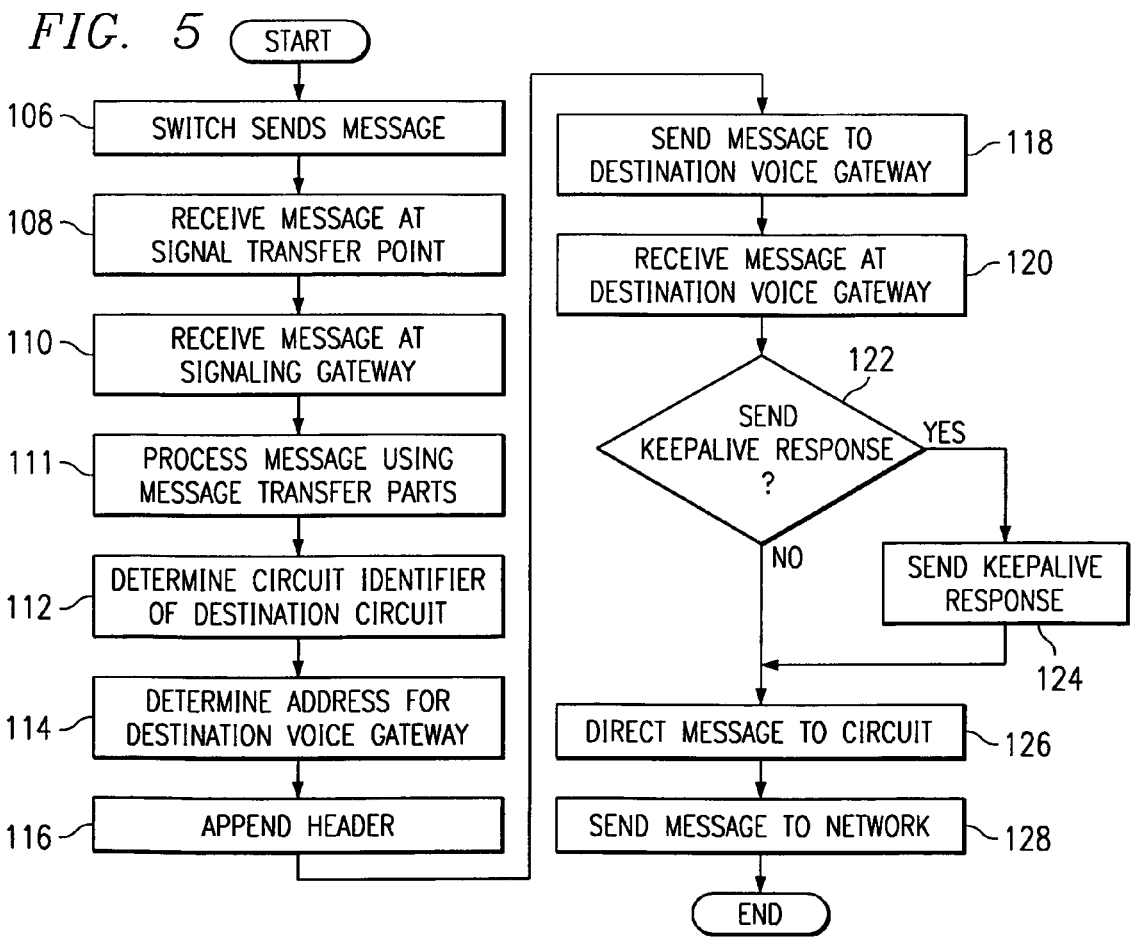

METHOD AND SYSTEM FOR TRANSMITTING MESSAGES IN A COMMUNICATIONS NETWORK

CROSS REFERENCE TO RELATED APPLICATIONS

This application is a continuation of U.S. application Ser. No. 09/687,852, filed Oct. 13, 2000 now U.S. Pat. No. 6,845,250 by Thiyagesan Ramalingam and entitled "METHOD AND SYSTEM FOR TRANSMITTING MESSAGES IN A COMMUNICATIONS NETWORK".

TECHNICAL FIELD OF THE INVENTION

This invention relates generally to the field of telecommunications and more specifically to a method and system for transmitting messages in a communications network.

BACKGROUND OF THE INVENTION

Messages in a communications network are often routed using a Signaling System 7 (SS7) protocol. Messages sent by a signal transfer point are received by a signaling gateway and routed to a voice gateway coupled to the signaling gateway. The signal transfer point identifies signaling gateways within the network by a point code that is configured in the signaling gateway. Each new voice gateway requires an additional signaling gateway through which messages are routed, and the signal transfer point is then reconfigured to recognize the new signaling gateway. Such reconfiguration, however, is time-consuming and prone to error.

SUMMARY OF THE INVENTION

A method and system for transmitting messages in a communications network is disclosed. A signaling gateway receives a message directed to a destination circuit. Multiple voice gateways, which include a destination voice gateway coupled to the destination circuit, are coupled to the signaling gateway. Circuits, including the destination circuit, are coupled to the voice gateways. The signaling gateway determines the destination voice gateway and sends the message to the destination voice gateway.

A signaling gateway for transmitting a message in a communications network is disclosed. A signaling software stack receives a message directed to a destination circuit, and determines a destination voice gateway coupled to the destination circuit. The destination voice gateway is one of a number of voice gateways coupled to the signaling gateway. A message direction part appends a header to the message. The header includes a voice gateway address that identifies the destination voice gateway.

A technical advantage of one embodiment of the system is that multiple voice gateways are coupled to a single signaling gateway. Additional voice gateways may be coupled to the signaling gateway without adding more signaling gateways. Another technical advantage is that a switch coupled to the signaling gateway does not need to be reconfigured when an additional voice gateway is coupled to the signaling gateway. Another technical advantage is that backing up the system does not require creating a redundant set of voice gateways coupled to the backup signaling gateway. Instead, a backup signaling gateway may be placed into service using existing voice gateways. Still another technical advantage is that message processing may be distributed from the signaling gateway to the voice gateways, thus reducing processing time in the signaling gateway itself. Other technical advantages will be apparent to one skilled in the art from the following detailed description.

BRIEF DESCRIPTION OF THE DRAWINGS

For a more complete understanding of the present invention and for further features and advantages, reference is now made to the following description, taken in conjunction with the accompanying drawings, in which:

FIG. 3 illustrates one embodiment of a hash table that the signaling gateway of FIG. 1 may use to determine a voice gateway to which a message is directed;

FIG. 4 illustrates one embodiment of a header that may be appended to a message; and FIG. 5 is a flowchart of one embodiment for a method for transmitting a message through the system of FIG. 1.

DETAILED DESCRIPTION OF THE DRAWINGS

Figure 1:
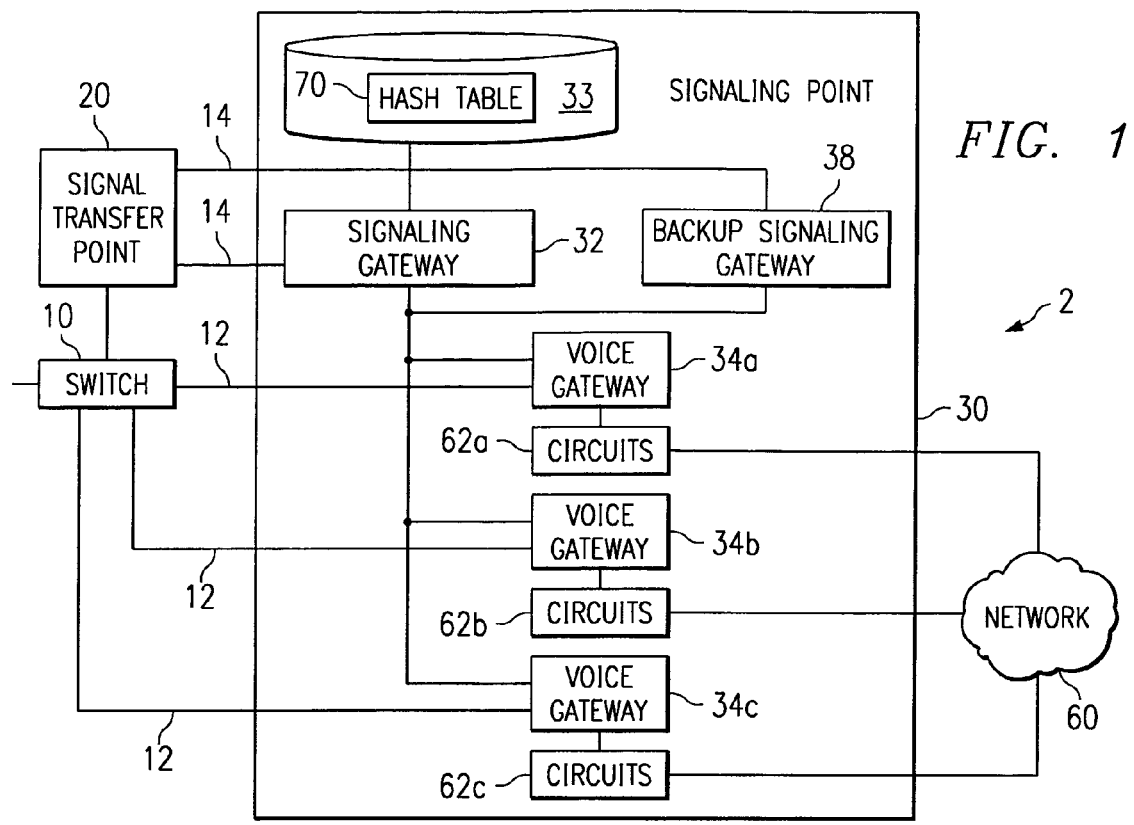
FIG. 1 is a block diagram of one embodiment of a system for transmitting a message in a communications network.

FIG. 1 is a block diagram of one embodiment of a system 2 for transmitting a message in a communications network. System 2 sets up communication sessions and directs signals in the communications network. Communications may include one or a combination of voice, video, audio, data or other communications. Any suitable protocol may be used in system 2. Because Signaling System 7 (SS7) protocol is typically used as a protocol for voice transfer, terms from the SS7 protocol are used in the following description, but it is understood that the invention could apply to equivalent structures using any appropriate protocol that provide services for directing or establishing communications or otherwise manage components in system 2.

A communications network, which includes system 2, includes one or a combination of a public switched telephone network (PSTN), a public/private communications network, a wireline/wireless network, a local, regional, or global communications network, and/or other suitable circuit-switched or packet based communications network. System 2 includes a switch 10, which may be a central office, end office, or other facility providing communications services. Switch 10 is coupled to a signal transfer point (STP) 20, which transfers signaling messages from one signaling link to another. Signal transfer point 20 is coupled to a signaling gateway (SG) 32 through a communication path 14 of the communications network.

Signal transfer point 20 is configured to recognize signaling gateway 32 by assigning a gateway identifier, for example, a 24-bit point code, to signaling gateway 32. Signaling gateway 32 can manage multiple voice gateways 34 so signal transfer point 20 may recognize one point code or equivalent gateway identifier for multiple voice gateways 34. Thus, system 2 is configured in a single point code architecture. It is understood, however, that the depicted embodiment could include more than one signaling point 30, and consequently more than one point code, if desired. The term "single point code architecture" does not mean that there is only one signaling gateway 32 within the signaling network, but rather indicates that multiple voice gateways 34 can be accessed with a single point code.

Signaling gateway 32 is coupled to voice gateways 34. Signaling gateway 32 and voice gateways 34 are known collectively as a signaling point 30. In general, gateways 32 and 34 intercept and redirect signals from one signaling link to another. Messages may include data, video, audio or other transmittable information. Examples of messages include initial address messages (IAM) to determine whether a circuit 62 is available for transmission, keepalive packets to verify that circuit 62 is active, and release messages to end a connection and free circuit 62 for another connection. In one embodiment, switch 10 is coupled to a communication path 12, for example, a T1 trunk, directly to one of several voice gateways (VGs) 34. Communication path 12 may carry, for example, voice, video, or data messages.

Signaling gateway 32 communicates with voice gateways 34 using a communications protocol. Voice gateways 34 are identified within signaling point 30 by an address appropriate to the communications protocol. For example, if the communications protocol is transmission control protocol/Internet protocol (TCP/IP), the address of each voice gateway 34 is an IP address. Each voice gateway 34 is coupled to a number of circuits 62 that provide a variety of voice, video, and/or data services. "Each" refers to each of a set or each of a subset of the set. Signaling gateway 32 determines which voice gateway 34 is associated with circuits 62 so that a message directed to a particular circuit 62 can be routed to the proper voice gateway 34. A memory 33 coupled to signaling gateway 32 stores a hash table 70 that provides information for determining the voice gateway 34. This recognition and routing process is described in greater detail in conjunction with FIGS. 3 and 4.

In operation, before switch 10 sends messages to a circuit 62, switch 10 verifies that circuit 62 is available to receive messages by sending an initial address message (IAM) to determine whether the circuit 62 is available for connection, or a keepalive packet to verify that circuit 62 is still responding. The initial address message seizes circuit 62 and provides information relating to the handling of the call. After determining availability, switch 10 sends a message. The message includes a header indicating a destination circuit 62 to which the message is directed, which is determined by the destination of the message, for example, a telephone number dialed by a caller. Signal transfer point 20 determines destination circuit 62 and sends the message to signaling gateway 32 associated with destination circuit 62.

Signaling gateway 32 receives the message, determines a destination voice gateway 34 coupled to the destination circuit 62, and sends the message to destination voice gateway 34. Several embodiments allow signaling gateway 32 to perform these tasks. Such embodiments are described in greater detail in conjunction with FIGS. 3 and 4. Voice gateway 34 receives the message, directs the message to the appropriate circuit 62 if possible, and replies to switch 10 if the message invites a response.

One embodiment of the single point code architecture presents several technical advantages. Signal transfer point 20 does not have to be reconfigured every time a new voice gateway 34 is added to signaling point 30 because signaling gateway 32, which is already recognized by signal transfer point 20, can accommodate the added voice gateway 34. The added voice gateway 34, on the other hand, can readily be reprogrammed by simply downloading software from the signaling gateway 32, reducing system failures due to errors in complicated reconfiguration processes. Additionally, system 2 is readily scalable because installing a new voice gateway 34 does not require adding another signaling gateway 32.

Furthermore, a single point code architecture dramatically reduces the complexity of the backup system. Backup systems are crucial for efficient operation of communications networks. In a multi-point code architecture, where each voice gateway requires its own signaling gateway, backing up the system requires complete replication of signaling point 30 as well as reconfiguration of signal transfer point 20 to recognize the backup system. In a single point code architecture, each component does not need to be replicated individually, thus reducing complexity of the backup systems. For example, if signaling gateway 32 fails, a backup signaling gateway 38 can take over by assuming the operations of the original signaling gateway 32 in the communications protocol. Backup signaling gateway 38 does not require redundant voice gateways 34 that go unused when the backup system is not being used. Instead, signaling gateway 32 can simply assume management of existing voice gateways 34. Similarly, a new voice gateway 34 can efficiently be put in place of another voice gateway 34 in the communications protocol if one of the voice gateways 34 fail.

Figure 2:
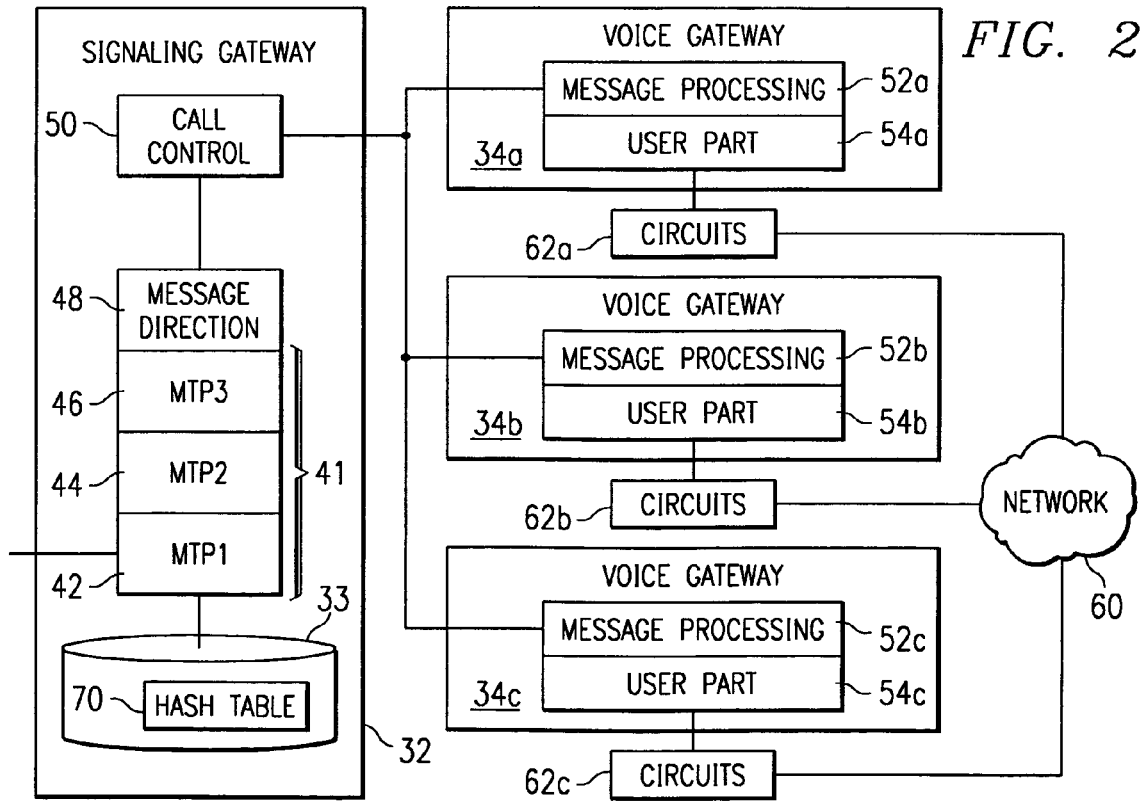
FIG. 2 illustrates one embodiment of message processing between the signaling gateway and the voice gateways of the system of FIG. 1.

FIG. 2 illustrates one embodiment of message processing between signaling gateway 32 and voice gateways 34 of FIG. 1. In one embodiment, a message is typically routed using one or more message transfer parts (MTPs), which provide processing for routing of messages between signaling points. A user protocol, such as an integrated services digital network (ISDN) user part (ISUP), which provides call setup signaling information between signaling points, may also be used. In multi-point code architectures, the signaling gateway executes all of the protocols. That is, message processing is localized at the signaling gateway. System 2, however, contemplates the use of any suitable messaging or signaling protocol. FIG. 2 illustrates how processing is distributed among signaling gateway 32 and voice gateways 34 in a single point code architecture.

In one embodiment, signaling gateway 32 receives a message. Signaling gateway 32 processes the message using a signaling software stack 41. Signaling software stack 41 identifies the destination circuit 62 to which a message is directed, and determines the destination voice gateway 34 coupled to the destination circuit 62. A hash table 70 in memory 33, which is described in connection with FIG. 3, may be used to associate the destination voice gateway 34 with the destination circuit 62.

Signaling software stack 41 typically includes three message transfer parts, MTP1 42, MTP2 44, and MTP3 46. The message terminates on each part, that is, the message arrives at an MTP and is directed to another part. For example, MTP1 42 manages a collection of physical circuits, MTP2 44 manages multiple MTP1s 42, and MTP3 46 manages multiple MTP2s 44. A message arriving from a physical circuit terminates on MTP1 42. MTP1 42 redirects the message to an MTP2 44, and MTP2 44 redirects the message to an MTP3 66. System 2, however, contemplates any level or combination of MTPs.

MTP3 46 of signaling gateway 32 transmits the message to a message direction part 48. Message direction part 48 may append a header to the message, as described in connection with FIG. 4, or may direct the message using a protocol such as signal control transfer protocol (SCTP). SCTP permits the message to be routed by circuit number without having to convert the circuit number to an IP address, thus saving a processing step. The message is sent to call control 50, which routes the message to the appropriate voice gateway 34 in a manner according to the communications protocol.

Voice gateway 34 receives the message and processes the message in a message processing part 52. In message processing part 52, voice gateway 34 may send the message to distribution circuit 62, edit the message to remove a header, generate a responding message for switch 10, or perform other functions relating to the availability of circuits 62 or the transmission of messages to circuits 62. Voice gateway 34 processes the message through a user part 54, for example, an ISDN user part (ISUP). User part 54 may direct setting up, coordinating, and terminating calls in system 2. User part 54 sends the message to a circuit 62.

The division of MTP1, 42, MTP2 44, MTP3 46, and user part 54 between signaling gateway 32 and voice gateways 34 demonstrates how standard message processing may be distributed within a single point code architecture. System 2 contemplates any distribution of processing between signaling gateway 32 and voice gateways 34 or all processing at signaling gateway 32 or all processing at voice gateway 34.

FIGS. 3 and 4 illustrate how signaling gateway 32 may interact with multiple voice gateways 34. FIG. 3 illustrates a hash table 70 that signaling gateway 32 may use to determine the particular voice gateway 34 to which a message is directed. FIG. 4 illustrates a header 80 that may be appended to a message directed to a destination voice gateway 34.

In one embodiment, signaling software stack 41 of signaling gateway 32 accesses a hash table 70 stored in memory 33. When signaling gateway 32 receives a message directed to circuit 62, signaling software stock 41 uses hash table 70 to determine the address for the proper destination voice gateway 34 that manages and is coupled to destination circuit 62. Hash table 70 associates a circuit identifier 72 of destination circuit 62 with a voice gateway address 76 of destination voice gateway 34 coupled to destination circuit 62. Circuit identifier 72 may include a circuit number, and a voice gateway address 76 may include an IP address. Hash table 70 also associates circuit identifier 72 with a signaling gateway identifier 74, for example, a point code of a signaling gateway 32 that can access destination circuit 62. Signaling gateway identifier 74 may be used to verify that destination circuit 62 is accessible by the signaling gateway 32 that is processing the message in order to check that the message has been sent to the correct signaling gateway 32.

Once signaling gateway 32 has the proper voice gateway address 76, the message direction part 48 appends header 80, an example is illustrated in FIG. 4, to the message in order to allow the message to be directed by the communications protocol. The message includes content 78 and header 80 that routes the message through system 2. Header 80 includes circuit identifier 72 and signaling gateway address 82. Signaling gateway address 82 may include an IP address of signaling gateway 32.

Header 80 also includes a sender identifier 84 for the sender of the message so that voice gateway 34 can direct responses to the sender using the communications protocol. The sender may include signal transfer point 20 or switch 10. Sender identifier 84 may include a point code for the sender. Header 80 also includes a keepalive bit 86 that instructs voice gateway 34 whether to send a keepalive response to prevent disconnection with switch 10. For example, the signaling-keepalive bit 86 may be set to "zero" if the voice gateway 32 needs to send a keepalive response to the switch 10 to maintain the connection, and "one" if no response is required, or vice versa.

Hash table 70 and headers 80 allow signaling gateway 32 to direct messages to voice gateways 34. Alternative processes may be used. For example, signal control transfer protocol (SCTP), a protocol for transferring messages between IP nodes, may be used to direct messages from signaling gateway 32 to voice gateway 34. SCTP allows messages to be routed by circuit identifier 72 to the voice gateway 34 without translating circuit identifier 72 into an IP address. Alternatively, the communications protocol itself could be tailored to simplify message transfer from signaling gateway 32 to voice gateway 34. For example, the signaling network could use a distributed protocol, such as a Cisco distributed protocol (CDP), that uses a less cumbersome method of node identification than a 4-byte IP address. System 2 contemplates one or a combination of any number of suitable protocols.

FIG. 5 is a flowchart of one embodiment of a method for transmitting a message in a communications network. The method begins at step 106, where switch 10 sends a message to signal transfer point 20. The message includes a header with a circuit identifier 72 of destination circuit 62 to which the message is directed. Signal transfer point 20 receives the message at step 108 and transfers the message to signaling gateway 32. Signaling gateway 32 receives the message at step 110, and processes the message using MTP1 42, MTP2 44, and MTP3 46 at step 111. MTPs 42, 44, and 46 provide processing for routing signaling messages between signaling points.

From the message header, signaling software stack 41 of signaling gateway 32 identifies circuit identifier 72 of destination circuit 62 at step 112. Signaling software stack 41 determines the voice gateway address 76 of destination voice gateway 34 that manages destination circuit 62 at step 114. Signaling software stack 41 may look up voice gateway address 76 using hash table 70 that associates circuit identifier 72 with voice gateway address 76. Message direction part 48 appends header 80 to the message at step 116. Header 80 includes circuit identifier 72 of destination circuit 62, signaling gateway address 82, sender identifier 84, and keepalive bit 86. After header 80 is appended, call control 50 routes the message to destination voice gateway 34 at step 118. Call control 50 may use TCP/IP communication protocol to send the message.

Destination voice gateway 34 receives the message at step 120. At step 122, destination voice gateway 34 determines whether a keepalive response is required in order to maintain the communication link based on the value assigned to keepalive bit 86. For example, keepalive bit 86 is "zero" if a keepalive response is required and "one" if a keepalive response is not required. If a keepalive response is required at step 122, the method proceeds to step 124, where voice gateway 34 sends a keepalive response to signaling gateway 32. The method then proceeds to step 126. If a keepalive response is not required at step 122, the method proceeds directly to step 126.

At step 126, voice gateway 34 directs the message to destination circuit 62. Voice gateway 34 may perform additional processing, for example, generating a response to the message or other processing appropriate to the message. Destination circuit 62 sends the message to external network 60 at step 128. After the message is sent, the method terminates.

A signaling network for telecommunications employing a single point code architecture overcomes drawbacks associated with multi-point code architectures. At the same time, it is easily adaptable to use in telecommunications systems. Although embodiments of the invention and its advantages are described in detail, a person skilled in the art could make various alterations, additions, and omissions without departing from the spirit and scope of the present invention as defined by the appended claims.

What is claimed is:

1. A method for transmitting a message in a communications network, comprising:

sending a message directed to a destination circuit of a plurality of circuits from a switch to a signal transfer point;

identifying a signaling gateway associated with the destination circuit;
determining a single point code corresponding to the signaling gateway; and
transferring the message from the signal transfer point to the signaling gateway, the signaling gateway coupled to a plurality of voice gateways, and operable to:
execute one or more message transfer parts to identify a voice gateway associated with the destination circuit, and send the message from the signal transfer point to the identified voice gateway; and
accommodate an additional voice gateway to the plurality of voice gateways, and download software from the signaling gateway to the additional voice gateway to reprogram the additional voice gateway.

2. The method of claim 1, wherein sending the message directed to the destination circuit of the plurality of circuits from the switch to the signal transfer point further comprises:
verifying that the destination circuit is available; and
sending the message if the destination circuit is available.

3. The method of claim 1, further comprising communicating the message according to a Signaling System 7 (SS7) protocol.

4. The method of claim 1, the signaling gateway further operable to send the message by:
determining a voice gateway address of the identified voice gateway; and
appending a header to the message to direct the message to the voice gateway address.

5. A system for transmitting a message in a communications network, comprising:
a switch operable to send a message directed to a destination circuit of a plurality of circuits; and
a signal transfer point coupled to the switch, and operable to:
receive the message from the switch;
identify a signaling gateway associated with the destination circuit;
determine a single point code corresponding to the signaling gateway; and
transfer the message from the signal transfer point to the signaling gateway, the signaling gateway coupled to a plurality of voice gateways, and operable to:
execute one or more message transfer parts to identify a voice gateway associated with the destination circuit, and send the message from the signal transfer point to the identified voice gateway; and
accommodate an additional voice gateway to the plurality of voice gateways, and download software from the signaling gateway to the additional voice gateway to reprogram the additional voice gateway.

6. The system of claim 5, the switch further operable to send the message directed to the destination circuit of the plurality of circuits from the switch to the signal transfer point by:
verifying that the destination circuit is available; and
sending the message if the destination circuit is available.

7. The system of claim 5, the signal transfer point further operable to communicate the message according to a Signaling System 7 (SS7) protocol.

8. The system of claim 5, the signaling gateway further operable to send the message by:
determining a voice gateway address of the identified voice gateway; and
appending a header to the message to direct the message to the voice gateway address.

9. A system for transmitting a message in a communications network, comprising:
means for sending a message directed to a destination circuit of a plurality of circuits from a switch to a signal transfer point;
means for identifying a signaling gateway associated with the destination circuit;
means for determining a single point code corresponding to the signaling gateway; and
means for transferring the message from the signal transfer point to the signaling gateway, the signaling gateway coupled to a plurality of voice gateways, and operable to:
execute one or more message transfer parts to identify a voice gateway associated with the destination circuit, and send the message from the signal transfer point to the identified voice gateway; and
accommodate an additional voice gateway to the plurality of voice gateways, and download software from the signaling gateway to the additional voice gateway to reprogram the additional voice gateway.

10. A method for transmitting a message in a communications network, comprising:
sending a message directed to a destination circuit of a plurality of circuits from a switch to a signal transfer point, sending the message directed to the destination circuit of the plurality of circuits from the switch to the signal transfer point further comprising:
verifying that the destination circuit is available; and
sending the message if the destination circuit is available;
identifying a signaling gateway associated with the destination circuit;
communicating the message according to a Signaling System 7 (SS7) protocol;
determining a single point code corresponding to the signaling gateway; and
transferring the message from the signal transfer point to the signaling gateway, the signaling gateway coupled to a plurality of voice gateways, and operable to:
execute one or more message transfer parts to identify a voice gateway associated with the destination circuit, and send the message from the signal transfer point to the identified voice gateway by determining a voice gateway address of the identified voice gateway and by appending a header to the message to direct the message to the voice gateway address; and
accommodate an additional voice gateway to the plurality of voice gateways, and download software from the signaling gateway to the additional voice gateway to reprogram the additional voice gateway.

11. A system for transmitting a message in a communications network, comprising:
a plurality of voice gateways coupled to a plurality of circuits, a voice gateway of the plurality of voice gateways associated with a circuit of the plurality of circuits, a voice gateway operable to process a message to transmit the message to the circuit associated with the voice gateway; and
a signaling gateway coupled to the plurality of voice gateways, the signaling gateway corresponding to a single point code and associating the plurality of voice gateways to the single point code, the signaling gateway operable to:
receive a message directed to a destination circuit of the plurality of circuits, execute one or more message transfer parts to identify a voice gateway associated with the destination circuits, and send the message to the identified voice gateway; and accommodate an additional voice gateway to the plurality of voice gateways, and download software to the additional voice gateway to reprogram the additional voice gateway.

12. The system of claim 11, the signaling gateway further operable to communicate the message according to a Signaling System 7 (SS7) protocol.

13. The system of claim 11, further comprising a backup signaling gateway operable to perform the following if the signaling gateway fails to perform the following:

receive the message directed to the destination circuit of the plurality of circuits;

execute the one or more message transfer parts to identify the voice gateway associated with the destination circuit; and send the message to the identified voice gateway.

14. A method for transmitting a message in a communications network, comprising:

receiving a message at a signaling gateway, the message directed to a destination circuit of a plurality of circuits, the signaling gateway coupled to a plurality of voice gateways, a voice gateway of the plurality of voice gateways associated with a circuit of the plurality of circuits, the signaling gateway corresponding to a single point code and associating the plurality of voice gateways to the single point code;

executing one or more message transfer parts to identify a voice gateway associated with the destination circuit;

sending the message to the identified voice gateway;

processing the message to transmit the message to the destination circuit;

accommodating an additional voice gateway to the plurality of voice gateways; and downloading software from the signaling gateway to the additional voice gateway to reprogram the additional voice gateway.

15. The method of claim 14, further comprising communicating the message according to a Signaling System 7 (SS7) protocol.

16. The method of claim 14, further comprising providing a backup signaling gateway operable to perform the following if the signaling gateway fails to perform the following:

receiving the message directed to the destination circuit of the plurality of circuits;

executing the one or more message transfer parts to identify the voice gateway associated with the destination circuit; and sending the message to the identified voice gateway.

17. A system for transmitting a message in a communications network, comprising:

means for receiving a message at a signaling gateway, the message directed to a destination circuit of a plurality of circuits, the signaling gateway coupled to a plurality of voice gateways, a voice gateway of the plurality of voice gateways associated with a circuit of the plurality of circuits, the signaling gateway corresponding to a single point code and associating the plurality of voice gateways to the single point code;

means for executing one or more message transfer parts to identify a voice gateway associated with the destination circuit;

means for sending the message to the identified voice gateway;

means for processing the message to transmit the message to the destination circuit;

means for accommodating an additional voice gateway to the plurality of voice gateways; and means for downloading software from the signaling gateway to the additional voice gateway to reprogram the additional voice gateway.

18. A system for transmitting a message in a communications network, comprising:

a plurality of voice gateways coupled to a plurality of circuits, a voice gateway of the plurality of voice gateways associated with a circuit of the plurality of circuits, a voice gateway operable to process a message to transmit the message to the circuit associated with the voice gateway;

a signaling gateway coupled to the plurality of voice gateways, the signaling gateway corresponding to a single point code and associating the plurality of voice gateways to the single point code, the signaling gateway operable to:

receive a message directed to a destination circuit of the plurality of circuits;

communicate the message according to a Signaling System 7 (SS7) protocol;

execute one or more message transfer parts to identify a voice gateway associated with the destination circuit;

send the message to the identified voice gateway;

accommodate an additional voice gateway to the plurality of voice gateways; and download software to the additional voice gateway to reprogram the additional voice gateway; and a backup signaling gateway operable to perform the following if the signaling gateway fails to perform the following:

receive the message directed to the destination circuit of the plurality of circuits;

execute the one or more message transfer parts to identify the voice gateway associated with the destination circuit; and send the message to the identified voice gateway.

* * * * *

UNITED STATES PATENT AND TRADEMARK OFFICE
CERTIFICATE OF CORRECTION

PATENT NO.       : 7,639,667 B1                                                    Page 1 of 1
APPLICATION NO. : 11/018329
DATED            : December 29, 2009
INVENTOR(S)      : Thiyagesan Ramalingam It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1407 days.

Signed and Sealed this

Ninth Day of November, 2010

David J. Kappos
*Director of the United States Patent and Trademark Office*